No. 788,522. PATENTED MAY 2, 1905.
W. A. P. COSSERAT.
APPARATUS FOR OPERATING AND CONTROLLING RAILWAY POINTS, SIGNALS, CROSSING GATES, &c.
APPLICATION FILED JULY 6, 1903.

Witnesses,
Arthur Woodman.
Herbert S. Knop.

Inventor,
Wilford Arthur Peloquin Cosserat
by John W. O'Donnell
Attorney.

No. 788,522. PATENTED MAY 2, 1905.
W. A. P. COSSERAT.
APPARATUS FOR OPERATING AND CONTROLLING RAILWAY POINTS,
SIGNALS, CROSSING GATES, &c.
APPLICATION FILED JULY 6, 1903.

Witnesses
Arthur Woodman
Herbert L. Knop

Inventor:
Wilford Arthur Ploquin Cosserat
by John H. O'Donnell
Attorney.

No. 788,522. PATENTED MAY 2, 1905.
W. A. P. COSSERAT.
APPARATUS FOR OPERATING AND CONTROLLING RAILWAY POINTS, SIGNALS, CROSSING GATES, &c.
APPLICATION FILED JULY 6, 1903.

Witnesses,
Arthur Woodward
Herbert S. Knop.

Inventor
Wilford Arthur Peloquin Cosserat,
by John W. O'Donnell
Attorney.

No. 788,522. PATENTED MAY 2, 1905.
W. A. P. COSSERAT.
APPARATUS FOR OPERATING AND CONTROLLING RAILWAY POINTS,
SIGNALS, CROSSING GATES, &c.
APPLICATION FILED JULY 6, 1903.

Witnesses,
Arthur Woodman
Herbert C. Knox

Inventor,
Wilford Arthur Peloquin Cosserat,
by John H. O'Donnell
Attorney.

No. 788,522. Patented May 2, 1905.

UNITED STATES PATENT OFFICE.

WILFORD ARTHUR PELOQUIN COSSERAT, OF KHARAGPUR, INDIA, ASSIGNOR OF TWO-THIRDS TO JOHN PATRICK O'DONNELL AND ERNEST COPELAND IRVING, OF WESTMINSTER, LONDON, ENGLAND.

APPARATUS FOR OPERATING AND CONTROLLING RAILWAY POINTS, SIGNALS, CROSSING-GATES, &c.

SPECIFICATION forming part of Letters Patent No. 788,522, dated May 2, 1905.

Application filed July 6, 1903. Serial No. 164,487.

*To all whom it may concern:*

Be it known that I, WILFORD ARTHUR PELOQUIN COSSERAT, residing at Bengal Nagpur Railway, Kharagpur, India, (whose post-office address is Bengal Nagpur Railway, Kharagpur, India,) have invented certain new and useful Improvements in Apparatus for Operating and Controlling Railway Points, Signals, Crossing-Gates, and the Like; and I do hereby declare the following to be a full, clear, and exact description of the invention, such as will enable others skilled in the art to which it appertains to make and use the same.

This invention relates chiefly to improvements in fluid-pressure apparatus for operating railway points, signals, crossing-gates, and the like, such as set forth in the prior specification of Letters Patent No. 647,483 and in the British specification of Letters Patent No. 5,575 of 1901.

The invention has for its object to provide a simple and efficient system for pneumatic railway signaling apparatus in which only two operating or controlling pipes are employed in addition to the usual main pressure-supply pipe, the arrangement being such that while one of said operating or controlling pipes is acting as an operating-pipe for conveying the fluid-pressure to the cylinder for actuating the switch-points, signal, or other part the other pipe will act as an indication-pipe for conveying the return fluid-pressure to indicate the completion of such operation of the switch-points or other apparatus by automatically completing the stroke of the operating-lever in the signal-cabin.

An important feature of this invention is comprised in the main controlling-valve, which is so constructed that in the operations of such valve by the movement of the interlocking lever or slide there is no crossing or momentary opening of ports or pipes that should remain closed during the working, and, further, any leakage of the motive fluid through the valve goes to exhaust.

Another important feature consists in the return-indication valves hereinafter described, which are so constructed that any leakage of the pressure fluid goes to exhaust. Therefore with this invention no incorrect or unauthorized operation or indication can take place in the working of the system, which thus provides a maximum of safety and reliability in operation.

There are further advantages, that will be obvious to those skilled in the art, and therefore need not be specified herein.

In the accompanying drawings, which illustrate the invention, Fig. 7ª is a detail of the three-way valves shown in Fig. 7.

The same numbers indicate the same and corresponding parts in the various figures of the drawings.

1 is the operating lever or slide in the signal-cabin, 2 being the handle of said lever.

3 is the slot in the lever, to which the usual mechanical interlocking tappet 4 is operatively connected, said tappet being preferably provided with a roller 5, which works in slot 3.

6 is the indication-slot in the lever or slide 1, said slot being preferably formed, as shown, with a lower horizontal portion and two upwardly-sloping end portions 7 and 8.

$7^a$ and $8^a$ are the shoulders or stop-faces at the ends of the horizontal part of slot 6.

9 and 10 are the indication-pistons, whose extensions or piston-rods are provided with rollers 11 and 12, respectively, which rollers work in the slot 6.

14 and 15 are the indication-cylinders in which the pistons 9 and 10 work.

The parts just described are identical in every respect to the corresponding parts shown and described in the prior specification of Letters Patent No. 647,483.

16 is the main controlling or machine valve for controlling the admission and cut off of the pressure fluid from the main supply-pipe to the operating or controlling pipes, as hereinafter described. The slide or valve 16 is operatively connected to the lever 1 by means of rod 17, the arrangement being such that the lever 1 and rod 17 are capable of partial movement independently of each other. The rod 17 is provided with a projection 18, which is beveled top and bottom, (more clearly shown in Fig. 2,) and said projection 18 normally rests on a beveled projection 19, which in the example shown is provided on a bracket 20, which latter is cast integral with or may be attached to the indication-cylinder 15. A beveled projection 21 is also provided on the lever 1, (or it might be on a rod or connection attached to said lever.)

Figure 1:
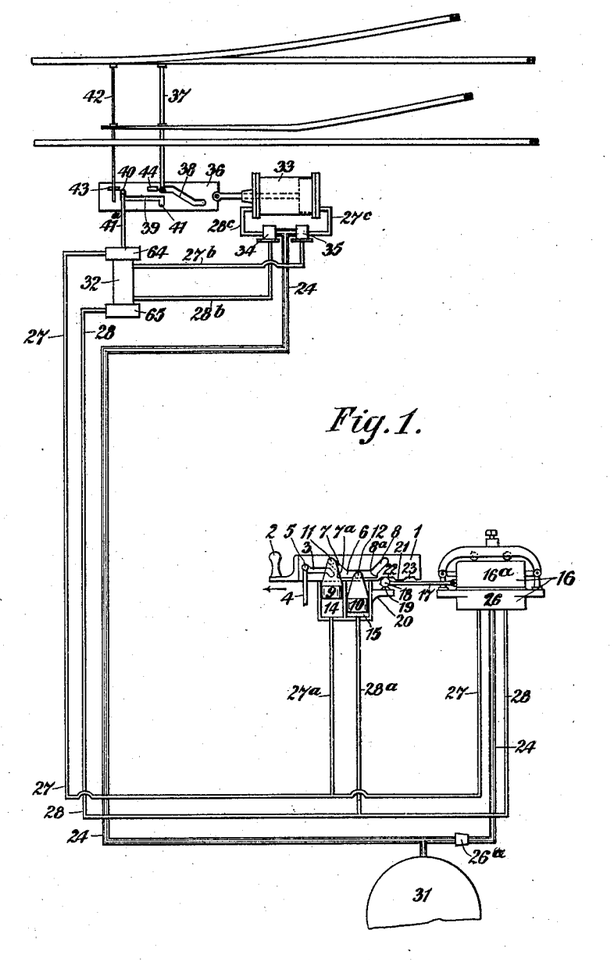
Figure 1 is a diagrammatic view showing an application of the invention for working a pair of switch-points and indicating the movements thereof.
Figure 2:
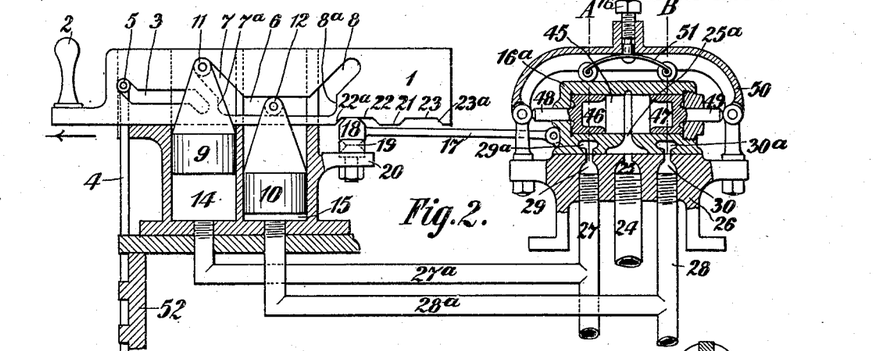
Fig. 2 is an elevation, partly in section, on an enlarged scale, of the operating lever or bar and its connected parts in the signal-cabin, showing details of the main controlling or machine valve.

The arrangement of the beveled projections in conjunction with the rod 17 and lever 1, as just described, forms a trip-gear by means of which the slide-valve $16^a$ may be released when the stroke of lever 1 is completed in either direction, thus permitting the valve $16^a$ to assume its normal position in the following manner: Assuming a movement of the lever 1 in the direction of the arrow—that is to say, from normal to reverse position—when the lever is pulled the left-hand beveled surface of projection 21 engages the upper part of the beveled projection 18 on rod 17, which latter, being prevented from moving down by the flat top of the projection 19, is compelled to follow the movement of the lever until projection 18 is moved clear of projection 19, when the rod 17 will drop so that the right-hand bevel on the under side of projection 18 slides down on the left-hand bevel of the block or projection 19, thus allowing the projection 21 on the lever to move onto the top of projection 18 on the valve-rod 17, which latter is retained in this position until the indication-piston 10 by completing the stroke of lever 1, as hereinafter described, moves projection 21 to the left clear of projection 18, and thus allows the valve $16^a$, rod 17, and projection 18 to return to the normal position, in which projection 18 again rests on top of 19. On the return stroke of the lever in the direction opposite to that of the arrow—that is, from reverse to normal—the right-hand bevel of projection 21 on the lever will engage the left-hand top bevel of 18, thus forcing the rod 17 and valve $16^a$ in the opposite direction to the right, the left-hand bottom bevel of 18 at the same time moving down on the right-hand bevel of 19, thus allowing the projection 21 on the lever to move onto the top of projection 18, the parts being retained in this position until the indication-piston 9 by completing the stroke of lever 1 moves the projection 21 clear of 18, when by the automatic movement of valve $16^a$, as hereinafter described, the projection 18 on rod 17 moves up again on top of 19 into its normal position, as shown in Figs. 1 and 2. In the preferred example of the invention herein set forth the valve $16^a$ and rod 17 are automatically returned to the normal middle position by fluid-pressure constantly acting on the valve-slide, as hereinafter described; but other means may be employed for returning the valve to the normal position. For example, springs might be employed for this purpose.

It will be seen that the movement of lever 1 by hand from the normal position toward the reverse position is limited by the shoulder $8^a$ coming in contact with roller 12 on indication-piston 10, and in the movement of the lever from reverse to normal the movement by hand is limited by the shoulder $7^a$ coming in contact with roller 11 (which latter in the reverse position of the lever will be in about the same position in slot 6 as roller 12 is when the lever is in the normal position, as shown in Figs. 1 and 2) on the indication-piston 9, precisely in the same manner as described with reference to the corresponding parts in the prior specification of Letters Patent No. 647,483.

22 and 23 are recesses in lever or slide 1 which engage the projection 18 on rod 17. In both the normal and reverse positions of the lever the outer bevels $22^a$ and $23^a$ prevent the valve $16^a$ being moved by hand.

24 is the main compressed-air-supply pipe, which is connected to a port 25 in the seat 26 (see Fig. 2) of the slide-valve 16.

$26^a$ is the usual reducing-valve in pipe 24.

27 and 28 are the two controlling or operating pipes, which are connected, respectively, to ports 29 and 30 in the valve-seat 26, Fig. 2.

$27^a$ $28^a$ are short branches, respectively, of pipes 27 and 28, said branches being connected to the indication-cylinders 14 and 15, respectively.

31 is the compressed-air reservoir, to which the main supply-pipe 24 is connected.

32 is what may be called a "combined controlling and return-indication valve," which is operatively connected to the operating mechanism of the switch-points or other apparatus to be worked. This valve 32 controls the admission of fluid-pressure to the diaphragm relay-valves 34 and 35 for operating the said relay-valves, and therefore controls the admission of fluid-pressure to the motor-cylinder. The valve 32 also controls the passage of return-indication fluid-pressure to the indicating-cylinders, as hereinafter explained. In the modification of this valve 32 shown in Fig. 6 and hereinafter described diaphragm relay-valves are disused and the admission of fluid-pressure to the operating-cylinder is controlled directly through the valve $32^a$, hereinafter described.

33 is the switch-point-operating cylinder or motor, and 34 35 the diaphragm relay-valves, which control the admission of main air-pressure from pipe 24 to cylinder 33 and also control the exhaust from said cylinder. The cylinder 33 and valves 34 35 are identically the same as the corresponding parts described and illustrated in the prior specification of Letters Patent No. 647,483 and British specification of Letters Patent No. 5,575 of 1901, (marked, respectively, C, $R^{20}$, and $R^{30}$ in said prior specifications,) and therefore need no detailed description herein.

36 is the motion-plate, which is operatively connected to the piston in cylinder 33 and to the stretcher-bar or operating connection 37 of the switch-points, said connection 37 engaging (by means of a roller or otherwise) the slot 38 in the motion-plate. These parts are also identical to the corresponding parts in the prior specifications above referred to. In the motion-plate 36 I provide an indication-slot 39, consisting of vertical portions 40 and 41, connected by the horizontal portion, as shown, and with this slot 39 the main slide or double piston of the valve device 32, hereinafter described, engages—for instance, by means of a roller on the end of rod 41, connected to said double piston.

42 is the usual locking-bar of the switch-points, which is provided with notches of different sizes adapted to be engaged by the locking projections or lugs 43 44 on the motion-plate, these parts being in the example shown identically the same as the corresponding parts in the above-mentioned prior specifications.

Referring now to Fig. 2, which shows details of the preferred form of the machine-valve 16 on an enlarged scale, according to this construction the valve-slide $16^a$ is provided with a chamber 45 and with ports $25^a$, $29^a$, and $30^a$, which ports in the normal position of the valve register, respectively, with the ports 25, 29, and 30 in the valve-seat 26. In the chamber 45 are two air buffers or pistons 46 and 47, whose stems 48 and 49, respectively, project through the ends of the slide $16^a$ so as to butt against or be engaged by yoke 50, which latter, in conjunction with the usual spring 51, retains the slide $16^a$ on its seat. 52 indicates the well-known mechanical interlocking troughs in which the interlocking tappets 4 work.

Although I have described and shown a particular construction of the valve 16, I do not limit myself to such construction, as it may be modified as desired, provided the advantages and results herein described are retained.

Figure 3:
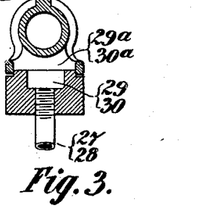
Fig. 3 is a vertical cross-section on lines A and B of Fig. 2.

In the normal position of the machine-valve 16, as shown in Fig. 2, the pipes 27 and 28 are open to exhaust to the atmosphere respectively through the ports 29 $29^a$ and 30 $30^a$, the ports $29^a$ and $30^a$ being open to the atmosphere on both sides of the valve, as clearly shown in Fig. 3. It will be observed that in the construction shown there is a constant pressure of air from the main supply-pipe 24 through ports 25 and $25^a$ in the chamber 45, which pressure tends to force the pistons or buffers 46 and 47 apart to the extreme limit of their movements in opposite directions, so that when lever 1 is operated as described the movement of the valve 16 is effected against the air-pressure exerted on the piston 46, and therefore when the projection 21 on lever 1 passes clear of projection 18 on the valve-rod 17, as hereinbefore described, (assuming the movement of the lever to be from normal to reverse position,) the air-pressure acting on piston 46 will immediately force the valve-slide $16^a$ back to the normal or middle position, as shown in Fig. 2. Correspondingly, if the movement of the lever is from reverse to normal such movement would be made against the air-pressure on piston 47, and when the trip-gear 18 21 is operated as hereinbefore described the valve-slide $16^a$ is forced back to the normal middle position by the compressed air acting on piston 47.

Figure 4:
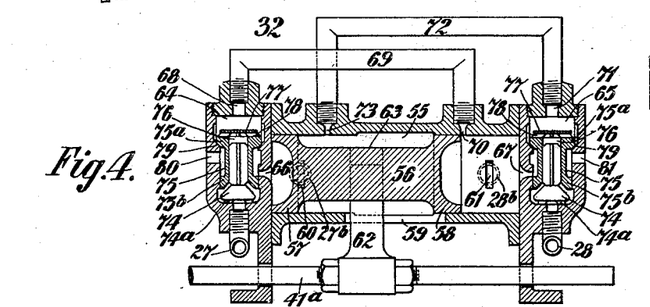
Fig. 4 is a sectional elevation of the combined controlling and indication valve device shown operatively connected to a slot in the motion-plate, Fig. 1, at the switch-points.

Referring now to Fig. 4, which shows details of the combined controlling and indication valve device 32, Fig. 1, in the main chamber 55 of this valve there is a double piston 56, with piston-heads 57 and 58. The space in the chamber 55 between the heads 57 and 58 is always open to the atmosphere through the opening 59. 60 and 61 are ports through the wall of chamber 55, to which are connected the branch pipes $27^b$ $28^b$, Fig. 1, respectively. An arm or projection 62 on rod $41^a$ (which latter, as before described, engages the slot 39 in the motion-plate 36, Fig. 1) engages a slot or hole 63 in the double piston 56, whereby said rod $41^a$ is operated when the piston 56 is actuated by compressed air admitted to chamber 55, as hereinafter described. The valve device 32 is also provided with chambers 64 and 65, one at each end of the valve-casing. Ports 66 67 lead, respectively, from the chambers 64 and 65 directly into the chamber 55. Chamber 64 is also in communication with the main chamber 55 through a port 68, pipe connection 69, and port 70, and chamber 65 is also in communication with chamber 55 through a port 71, pipe connection 72, and port 73. In lieu of the pipes 69 and 72 air-passages might be provided in the wall of the valve-casing. In each of the chambers 64 and 65 there is what may be called a "double-acting" piston-check valve, which in the example shown in the drawings consists of a conical or mushroom ended miter or wing valve 74, working in a piston-valve 75, having a central passage 76, said valve 75 having annular end rings 75$^a$ 75$^b$. The valves 74 are provided with two or more small projections or feet 74$^a$ for the purpose hereinafter explained. In connection with the annular head or ring 75$^a$ (of each valve 75) is a disk or plate 77, connected thereto by webs or strips 78, so that there is always a free passage for compressed air between the passage 76 and the space above the disk 77. Normally, when there is no compressed air admitted to the valve-chambers 64 65, or when the pipes 27 or 28 (or both) are open to exhaust through the machine-valve 16, the valves 75 will be in the normal position, as shown, with the feet 74$^a$ of valves 74 resting on the bottom of the valve-chambers and the annular ring 75$^a$ of the valves 75 resting on a seat 79 in the chambers 64 and 65. 80 is an exhaust-port connecting the left-hand end of chamber 55 to the atmosphere through chamber 64, and 81 is an exhaust-port connecting the right-hand end of chamber 55 to the atmosphere through chamber 65. The valve (comprising the parts 74 75) in each of the chambers 64 and 65 are identical in every respect, so that it will be only necessary to fully describe the action of one of these valves. Therefore, referring to the valve in chamber 64, when compressed air enters said chamber through the pipe 27 (as hereinafter described) the wing-valve 74 is forced up, so that its conical head is seated on and closes the lower end of passage 76 in the valve 75, which latter is then moved upward so that the annular ring 75$^b$ moves past and opens port 66, thus admitting compressed air to the chamber 55 at the left of piston-head 57, which latter thereupon moves past and opens port 60, (the piston-head 58 at the same time closing port 70,) and thus admits compressed air to the branch pipe 27$^b$ (see Fig. 1) and through said pipe to the relay-valve 35, thus admitting air from the supply 24 to the switch-point-operating cylinder 33 to operate the switch-points, as hereinafter described. When the movement of the switch-points has been completed, the double piston 56 is given a further movement to the right, and thus opens port 73, (the piston-head 58 at the same time by passing ports 61 and 70 lets them communicate with exhaust-opening 59,) and compressed air then passes through the pipe 72 and port 71 into the upper end of the valve-chamber 65, down through the central passage 76 of the valve 75 in said chamber, and out through the pipe 28 to the indication mechanism in connection with the operating-lever in the signal-cabin, thus giving the indication of the completion of the movement of the switch-points. For the other or reverse movement of the switch-points the compressed air enters the valve-chamber 65 through pipe 28 and actuates the valve in said chamber in precisely the same manner as described above with reference to the valve in chamber 64, so that compressed air will now be admitted through port 67 to the right-hand side of piston-head 58, (which by the previous movement was made to pass by ports 61 and 70,) which is thereby moved to open port 61 and admit compressed air through the branch pipe 28$^b$, Fig. 1, and through said pipe to the relay-valve 34, thus admitting air from the supply-pipe 24 to the point-operating cylinder 33, and when the movement of the switch-points is completed the double piston 56 is given a further movement to the left, so as to cause the head 58 to pass and open port 70, thereby admitting compressed air to pipe 69, and through port 68 in the upper end of chamber 64 down through the central passage 76 of the valve in said chamber 14 into pipe 27, and through said pipe to the indication mechanism in connection with the operating-lever in the signal-cabin for indicating this movement of the switch-points and completing the interlocking. It will be seen that when the piston 56 is operated, as above described, for admitting compressed air through the ports 61 and 70 the ports 60 and 73, and consequently the pipe 72, will be open to exhaust through chamber 55 and opening 59, and correspondingly when piston 56 is moved, as previously described, to admit compressed air to ports 60 and 73 the ports 61 and 70 will be opened to exhaust through chamber 55 and opening 59.

Figure 5:
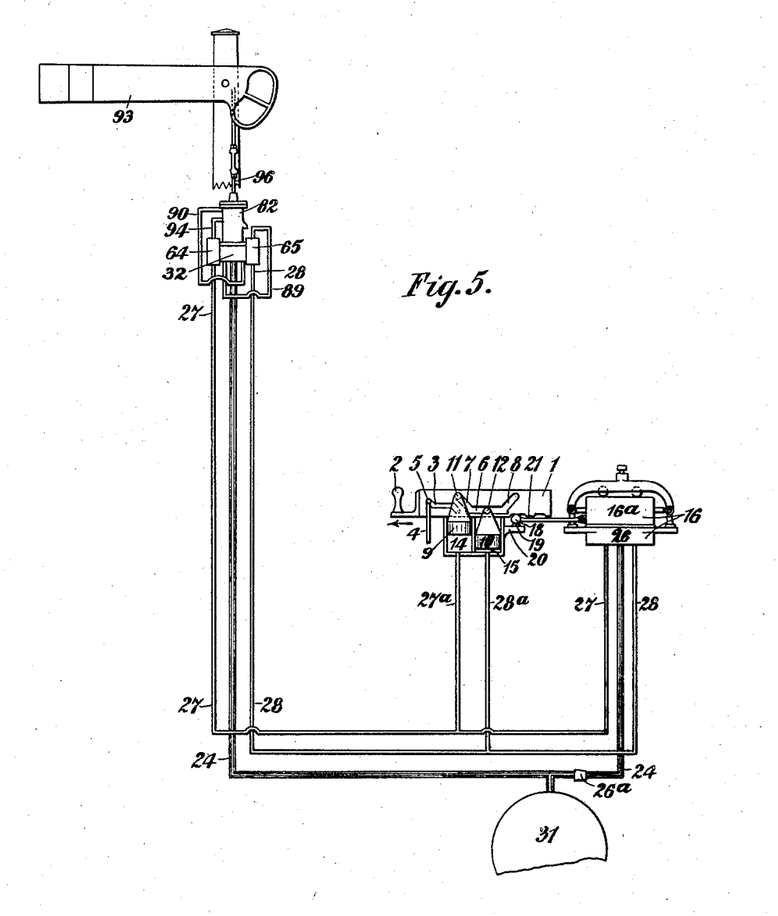
Fig. 5 is a diagrammatic view of an application of the invention for working a semaphore-signal.
Figure 6:
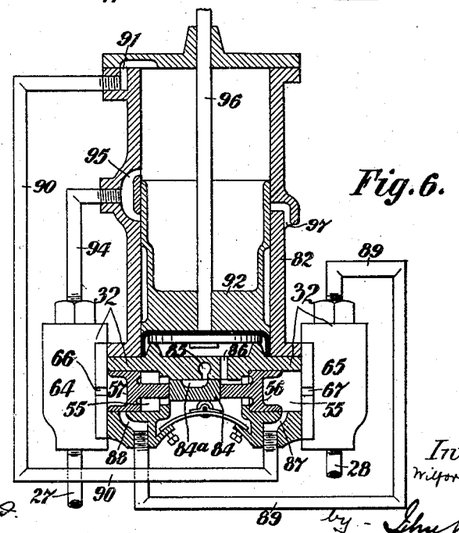
Fig. 6 is an elevation, partly in section, of the signal-operating motor or cylinder and the combined controlling and indication valve device in conjunction therewith.

Referring now to Fig. 6, which shows details of the signal-operating cylinder or motor 82, Fig. 5, and its controlling and indication valve device 32, which latter is attached to the cylinder 82, the signal controlling and indication valve device consists of a somewhat modified construction of the combined controlling and indication valve (marked 32 in Figs. 1 and 4) principally as regards the double piston 56, which in the construction shown in Fig. 6 is connected to or operates a slide-valve 84, which controls ports 85 and 86 in the cylinder 82, the ports 85 and 86 in the example shown being provided in the end or cover of cylinder 82. The port 85 is connected to the main air-supply pipe 24, so that the valve 84 controls the admission of main air-pressure from pipe 24 through port 86 to the cylinder for operating the signal from the normal or danger position to the safety position, and also controls the exhaust of the cylinder 82, through said port 86, to the atmosphere through an opening in the valve-casing. The valves in the chambers marked 64 and 65 are identical in construction and working to those shown in Fig. 4.

87, Fig. 6, is the equivalent of port 61, Fig. 4—that is to say, the compressed air for operating the signal from the safety or reverse position to the danger or normal position is admitted to cylinder 82 through said port 87—and port 88 and pipe 89 are the equivalents, respectively, of port 73 and pipe 72 in Fig. 4—that is to say, port 88 and pipe 89 in Fig. 6 act to convey the return-indication air from valve-chamber 55 to chamber 65 and through the double check-valve in the latter chamber to the controlling-pipe 28, and thence to the indication mechanism of the signal-cabin. The pipe 90 is connected to port 87 and to a port 91 at the upper end of cylinder 82 and acts to convey the compressed air admitted to chamber 55 through the valve device in chamber 65 to cylinder 82 for operating the piston 92 therein, so as to move the signal-arm 93, Fig. 5, to the normal or danger position. The signal-operating cylinder 82 is a self-indicating cylinder for the danger position of the signal—that is to say, the pipe 94, connected to the valve-chamber 64, is also connected to a port 95 in the wall of cylinder 82, so that in the downward stroke of piston 92 in moving the signal to "danger" when the piston passes clear of port 95 the compressed air admitted to the upper end of cylinder 82 escapes through port 95 into pipe 94 and through the valve in chamber 64 into the pipe 27, and thence to the indication mechanism in the signal-cabin.

96 is the piston-rod or connection to which the signal-arm 93, Fig. 5, is operatively connected, and 97 is an exhaust-port in the wall of cylinder 82.

Referring to Figs. 1 to 4 of the drawings, inclusive, the working of the invention is as follows: Assuming the parts to be in the normal positions, as shown in these figures, the controlling-pipes 27 and 28 are open to exhaust to the atmosphere, respectively, through the ports 29 29$^a$ and 30 30$^a$ (see Figs. 2 and 3) in the main controlling-valve, and the valve device 32 is also at exhaust through said pipes 27 28, as well as through the ports 80 and 81, Fig. 4. On the signalman pulling over the lever or slide 1 in the direction of the arrow until the shoulder 8$^a$ at the right-hand end of slot 6 comes in contact with the roller 12 on indication-piston 10 the further movement of the lever by hand is stopped. By this movement of the lever the roller 11 on indication-piston 9 will be in the horizontal portion of slot 6 at the bottom of the sloping portion 7, and the slide 16$^a$ of valve 16 is moved through the rod 17, as hereinbefore described, into the position in which the port 30 and pipe 28 are cut off from the exhaust, and the port 25$^a$ in said slide connects the main air-pipe 24, through port 25 in the valve-seat, with port 29 and operating or controlling pipe 27, thus admitting compressed air (at the reduced pressure consequent upon its passage through the reducing-valve 26) to said pipe 27, and thereby to the chamber 64 of the combined controlling and indication valve 32 adjacent to the switch-points. (See Figs. 1 and 4.) The compressed air on entering the chamber 64 actuates the valve mechanism therein, as hereinbefore described, so as to allow the compressed air admitted to pipe 27 to continue its course into and through the branch pipe 27$^b$, Fig. 1, to the diaphragm of relay-valve 35, which latter valve is thus actuated (in the well-known manner as described in the prior specification, No. 647,483) to admit main air-pressure from the pipe 24 to branch pipe 27$^c$ and to the switch-point-operating cylinder 33, thus forcing the piston therein to the left, and through the slot 38 in the motion-plate 36, acting on connection 37, the switch-points are thus moved to the reverse position. The actuation of the double piston 56, Fig. 4, by the admission of compressed air through chamber 64, as above described, moved the roller on rod 41$^a$ down and clear of the left-hand vertical portion 40 of slot 39 in the motion-plate into the horizontal portion of said slot, thus unlocking the switch-point-operating mechanism and permitting the operation of the switch-points, as above described. When the movement of the switch-points has been completed, rod 41$^a$ is given a further movement by the compressed air acting on the piston-head 57, so that the roller on rod 41$^a$ is moved down in the right-hand vertical portion 41 of slot 39, thus locking the switch-point-operating mechanism in the reverse position. This further movement of piston 56 opens the port 73 in the chamber 55, (at the same time closing said port against exhaust through opening 59,) so that the compressed air admitted through pipe 27 to chamber 55 can now pass through port 73 and passage or port 72 into the chamber 65 and down through the central passage 76 of the valve in said chamber and into the other operating or controlling pipe 28 and through said pipe and its branch 28$^a$ into the indication-cylinder 15, thus forcing up the piston 10 in said cylinder, so that the roller 12 acts on the sloping portion 8 of slot 6, and thus automatically completes the stroke of the lever in the direction of the arrow and also completes the movement of the interlocking tappet 4, and when this automatic completion of the stroke of lever 1 takes place the slide 16$^a$ of the machine-valve 16 is automatically returned to its normal or middle position by means of the compressed air acting on piston 46, Fig. 2, as hereinbefore described, so that the ports 29 and 30 and pipes 27 and 28 are again opened to exhaust to the atmosphere, respectively, through ports 29ª and 30ª. When it is desired to replace the switch-points to the normal position again, lever 1 is pushed by hand in the direction opposite to that of the arrow until the roller 11 butts against the shoulder or stop-face 7ª of slot 6, which movement of the lever moves the valve-slide 16ª from the normal position to the right, so that the main live-air port 25 and pipe 24 are connected by port 25ª in the valve-slide to the port 30, leading into pipe 28, and at the same time port 29 and pipe 27 are cut off from the exhaust by the face of the valve-slide. The compressed air thus admitted to pipe 28 goes into chamber 65 of the combined controlling and indication valve, operating the valve in said chamber 65, so as to allow the compressed air to pass through port 67, Fig. 4, into the right-hand end of chamber 55, thereby moving the double piston 56 to the left, (or in the opposite direction to that in which it was moved by the compressed air admitted to pipe 27, as above described,) thus opening the port 61 and closing port 70 in the chamber 55, so that the compressed air now passes through port 61 into branch pipe 28ᵇ to relay-valve 34 and through the latter and branch pipe 28ᶜ to the left-hand end of cylinder 33, thus moving the piston in said cylinder back to the position shown in dotted lines in Fig. 1 and through the motion-plate and connection 37 also moving the switch-points back to the normal position, as shown in Fig. 1. The initial movement of piston 56 in chamber 55, Fig. 4, operates the rod or connection 41ª so as to lift the roller on said rod out of the right-hand vertical portion of the indication-slot 39 in the motion-plate, (thus unlocking the switch-point-operating mechanism,) and when the movement of the switch-points has been completed the further or final movement of piston 56 by the compressed air admitted to chamber 55 raises the roller on the rod 41ª into the slot 40, thus locking the switch-points, and this movement opens the port 70 and allows the return-indication current of compressed air to pass through pipe 69 through port 68 into the chamber 64 and down through the passage 76 into pipe 27, through which it passes to the branch 27ª and into the indication-cylinder 14, forcing up the piston 9 therein and causing the roller 11 on said piston to act on the sloping portion 7 of the indication-slot in lever 1, thus completing the return stroke of the lever to the normal position, as shown in Fig. 1. This automatic completion of the stroke of the lever again allows the slide 16ª of valve 16 to be automatically moved to the middle or normal position by the compressed air acting on the piston 47, Fig. 2, so that both the pipes 27 and 28 are again opened to exhaust to the atmosphere, respectively, through the ports 29 29ª and 30 30ª, and the valve device 32 is also opened to exhaust, as previously described.

Referring now to Figs. 5 and 6, the cycle of operations for moving the signal-arm from the normal danger position to the reverse or safety position, and vice versa, is identical in every respect to that described with reference to Figs. 1 to 4, inclusive, the differences in Figs. 5 and 6 being principally in the modified construction of the combined controlling and indication valve and its arrangement in conjunction with the signal-operating cylinder 82, as hereinbefore described. With this arrangement I do away with the diaphragm relay-valves employed in the prior specifications of patents hereinbefore referred to for controlling the admission of compressed air to the signal-operating cylinder, the valve device 32 in the present invention performing the functions of said relay-valves as well as controlling the return indications of the movements of the signals. In Figs. 5 and 6, assuming a movement of the signal-arm from the normal danger position to "safety," the compressed air is admitted through pipe 27 (as described with reference to Figs. 1 to 4) to the valve device in chamber 64, thence through port 66 to chamber 55, and acts on piston-head 57, thus moving the double piston to the right and with it the valve 84, so that the channel or port 84ª in said valve connects the main air-port 85 with port 86, thus admitting main air-pressure from pipe 24 into the cylinder 82, so as to move the piston 92 up, thereby through the connection 96 lowering the signal-arm 93 to the safety position. When the piston-head 57 passes clear of and opens port 88, compressed air passes through said port into the pipe 89 and down through the valve device in chamber 65 into pipe 28, and thence to the indication mechanism in the signal-cabin precisely in the same manner as described with reference to the previous Figs. 1 to 4. For returning the signal-arm 93 to the horizontal or danger position the compressed air admitted through pipe 28 goes to the valve device in chamber 65 of the controlling and indication valve 32, Fig. 5, and thence through port 67 to chamber 55, where it acts on piston-head 56, so as to force said head, together with valve 84 and piston-head 57, back to the position shown in Fig. 5, thereby opening the lower end of cylinder 82 to exhaust through port 86 and open space 59 and at the same time opening port 87, so that the compressed air now passes through said port 87 into pipe 90 and through port 91 into the upper end of cylinder 82 above the piston, thus forcing said piston down, and through the connection 96 moving the signal-arm 93, Fig. 5, back to "danger." In this downward movement of piston 92, Fig. 6, immediately the upper end of the piston passes the opening of port 95 into the cylinder compressed air passes from the cylinder through port 95 and pipe 94 into and through the valve-chamber 64 and thence through operating-pipe 27 into the indication mechanism in the signal-cabin, thus automatically completing the stroke of the lever, as hereinbefore described with reference to Figs. 1 to 4, inclusive.

With reference to the foregoing description of the working of my invention it will be noticed that where compressed air is admitted to either pipe 27 or pipe 28 (as the case may be) compressed air will also go through the respective branch pipes 27ª or 28ª and into the respective indication-cylinders 14 or 15; but this admission of compressed air to the indication-cylinder does not effect any indication or movement of the operating-lever, as when the pressure is admitted to either of the pipes 27 or 28 the roller on the respective indication-pistons (9 or 10, as the case may be) will be in the horizontal portion of the slot 6, so that no movement of the indication-piston takes place. Further, with the arrangements as shown and described herein the indications are effected by compressed air at the reduced pressure consequent upon its passage through reducing-valve 26ª; but I do not limit myself to the use of the lower pressure-air for this purpose.

Figures 7, 7A:
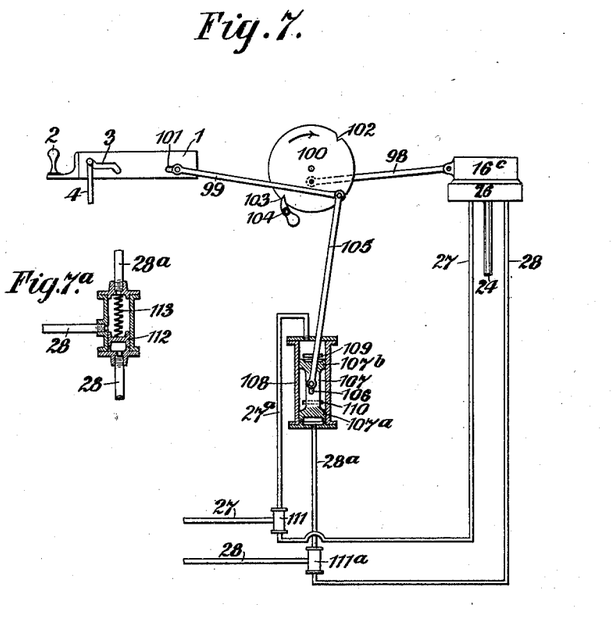
Fig. 7 is a diagrammatic view, partly in section, of a modified form of the operating lever or bar and its connection to the main controlling or machine valve. This figure also shows a single indication-cylinder, in which there is a double-acting piston operatively connected to the lever and machine-valve.

Referring now to Fig. 7, the main controlling or machine valve 16ᶜ is connected to lever 1 by means of links 98 and 99, pivoted to a rotatable disk or wheel 100, said disk being preferably supported at its periphery on friction-rollers mounted in a suitable support or frame. The link 98 is pivoted to the slide-valve 16 and the link 99 is pivoted to lever 1, the end of said link engaging a slot 101 in the lever. 102 and 103 are notches in disk 100, with which a pawl 104 is adapted to engage for the purpose of preventing backward movement of said disk at each completed movement of the indication-piston. 105 is a rod or link pivoted at one end to disk 100 on the same center as link 99 is pivoted on said disk. The other end of rod 105 is pivotally connected to a slot 106 in a double-acting piston 107, which works in the indication-cylinder 108. 109 and 110 are exhaust-ports through the wall of cylinder 108. The piston 107 acts to give the indications for both movements of the switch-points, signal, or other apparatus to be worked. The branch pipe 27ª is in this case connected to the top of cylinder 108, and branch pipe 28ª is connected to the bottom of said cylinder. 111 111ª are three-way valves inserted, respectively, in the pipe-lines 27 and 28. The normal position of the valves 111 111ª is, as shown in Fig. 7ª, with the plunger or piston 112 down in the position shown. 113 is a spring tending to keep the plunger 112 in the position shown in Fig. 7ª. With this arrangement the pistons or air-buffers 46 and 47, Fig. 2, may be omitted from the machine-valve 16, which, however, in other respects is the same as that shown in Figs. 1 and 2. The working, according to this arrangement, is as follows: Assuming that it is desired to move the switch-points from the normal to the reverse position, the signalman pulls the lever or slide 1 to the full limit of its stroke in the direction of the arrow, (this movement of the lever or slide does not communicate any motion to indication-piston 107 on account of the provision of slot 106,) and thus through link 99 revolves the disk 100 through a quarter of a revolution in the direction indicated by the arrow on said disk and by means of link 98 operates the valve 16ᶜ to the position in which it admits compressed air from the main pipe 24 to pipe 27 and thence through the valve device 32, Fig. 1, to the operating-cylinder 33, as hereinbefore described, and when the movement of the switch-points has been completed the return air-current coming through pipe 28 enters the three-way valve 111ª above the piston or plunger 112 and goes through branch pipe 28ª to the lower end of indication-cylinder 108, thus forcing up the piston 107, (this movement of piston 107 does not communicate any motion to the lever or slide on account of the provision of the slot 101,) which by means of the link 105 turns disk 100 through another quarter-revolution, so that the notch 102 now engages pawl 104, said pawl preventing the disk from turning backward, so that the piston 107 is retained in its raised position in cylinder 108, in which position the space on top of piston-head 107ᵇ is cut off from the exhaust-port 109. This further movement of disk 100 operates the link 98 so as to move the slide-valve 16 back to the normal or middle positions, so as to again open pipes 27 and 28 to exhaust through said valve as described with reference to Figs. 1 to 4, inclusive. It will be seen that with this mechanism there is no automatic movement of the lever 1 by the return-indication air-current and that the automatic movement of the valve 16 back to the normal position is effected mechanically by the operation of disk 100 as above described. When the indication-piston 107 has been moved up by the return indication-current of compressed air admitted through pipe 28 and branch 28ª and the piston-head 107ª has moved past the exhaust-port 110, the indication movement will have been completed and the air behind the head 107ª will exhaust to the atmosphere through said port 110. For returning switch-points to the normal position again the lever 1 is pushed in the direction opposite to that of the arrow to the full limit of its stroke, thus again revolving the disk 100 through a quarter-revolution and through link 98 operating the machine-valve 16ᶜ, so as to admit main air to pipe 28, and thus move the switch-points back to the normal position, as previously described, and when this movement has been completed the return-indication air-current is admitted to pipe 27, as described with reference to Figs. 1 to 4, and passes through the three-way valve 111 and branch pipe 27ª into the upper end of indication-cylinder 108, and thus forces the piston 107 down again to the position shown, thereby through rod 105 giving the disk 100 a further quarter-turn, which again brings notch 103 (which in the previously-described movement of disk 100 was moved round into the position occupied by notch 102) back into engagement with the pawl 104. This further movement of disk 100 again moves valve 16ᶜ back to the normal or middle position in which the pipes 27 and 28 are again open to exhaust and the passage of main air from pipe 24 into said pipes is cut off. It should be mentioned that where the pistons 46 and 47, Fig. 4, are omitted from valve 16ᶜ the main air-inlet port 25ª in the valve-slide 16ª may, if desired, be formed as an arched passage through the lower portion of the valve-slide, so that in the normal position of said slide there is a face or solid portion of the slide which closes the main air-inlet port 25 in the valve-seat—that is to say, with this construction there would not be a constant air-pressure in the valve 16, as in the case of Fig. 4.

It will be seen that when the piston 107 is moved back to the normal position, as shown in Fig. 7, the air that forced said piston down escapes to the atmosphere through exhaust-port 109. It will also be seen that when the compressed air is admitted through the machine-valve 16ᶜ to either pipe 27 or pipe 28 for operating the switch-points, signal, or other apparatus the plunger 112 in three-way valve 111 (or 111ª, as the case may be,) is forced up against the action of spring 113, thus allowing the compressed air to pass into the continuation of pipe 27 (or 28) on the left-hand or outlet side of the three-way valve.

Figures 8, 9:
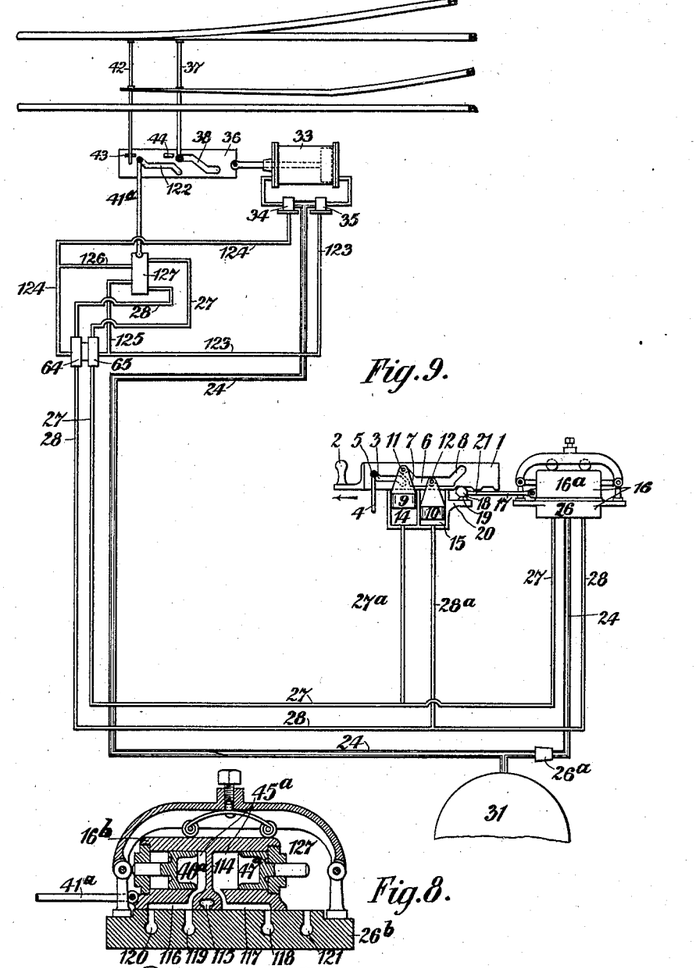
Fig. 8 is a sectional elevation of a modification of the machine-valve adapted for use as an indication-valve for controlling indications of the completion of the movements of the switch-points, signal, or other operated part.
Fig. 9 is a diagrammatic view of an arrangement for the operation of a pair of switch-points in which the indication-valve according to Fig. 8 is employed.
Figure 10:
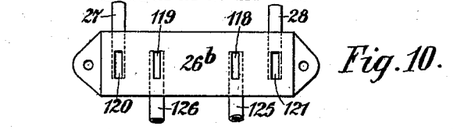
Fig. 10 is a plan view of the valve-seat of Fig. 8.

A modification of the main controlling or machine valve 16, Figs. 1 and 2, for use as an indication-valve is marked 127 in Fig. 9. The difference between this construction and that of Fig. 2 consists in providing a partition 114, dividing the chamber 45ª of the slide 16ᵇ into two compartments, said partition being provided with an exhaust-port 115, and said slide has air passages or ports 116 and 117 formed therein, which passages register with ports 118, 119, and 120 in the valve-seat 26ᵇ in the normal position of the slide, as shown in Fig. 8. There is also a port 121 in the seat 26ᵇ, which port is normally open to exhaust to the atmosphere. The connection or rod 41ª from the valve-slide 16ᵇ engages the indication-slot 122 in the motion-plate 36, which slot in this case is the same as the corresponding slot marked m' in the prior specification of Letters Patent No. 647,483. Referring to Fig. 9, there are inserted in the pipe-lines 27 and 28 the hereinbefore-described double check-valves working in chambers 64 and 65, Fig. 4. The pipes 27 and 28 are connected, respectively, to the valve-chambers 65 and 64 and are also connected, respectively, to the ports 120 and 121 in the valve-seat 26ᵇ, Figs. 8 and 10. Instead of the ports 66 67 opening into chamber 55, as in Fig. 4, in the arrangement shown in Fig. 9 branch pipes 123 and 124 are connected, respectively, to said ports 66 and 67, and these pipes are also connected to the diaphragm relay-valves 35 and 34. From the pipes 123 and 124, respectively, branch pipes 125 and 126 are connected to the ports 118 and 119, Figs. 8 and 10, respectively.

The exhaust-port 115, Fig. 8, is provided, so that should there be any leakage of compressed air between the face of valve-slide 16ᵇ and the valve-seat such leakage will exhaust to the atmosphere instead of going into any of the pipe connections to the valve-seat, thus avoiding the possibility of incorrect operations or indications through leakage.

The working of the apparatus, as shown in Fig. 9, is the same as regards the operating-lever and its connected parts, as previously described. In Fig. 9 the indication-valve (marked 127,) whose details are shown in Figs. 8 and 9, is mechanically operated by means of slot 122 in the motion-plate 36 each time the switch-points are operated by the admission of compressed air to cylinder 33. In this figure also when compressed air is admitted through pipe 27 or 28, as the case may be, to the respective valve-chambers 65 or 64 the compressed air will enter the respective branch pipe 123 or 124 and will also enter the respective branch pipe 125 or 126, as the case may be.

Assuming a movement of the switch-points from the normal position, as shown, to the reverse position, the compressed air admitted to pipe 27 (by the movement of the operating-lever 1, as hereinbefore described) will enter the valve-chamber 65 and actuate the double check-valve therein so as to open the port 67, (see Fig. 4,) and thus permit the compressed air to pass into and through branch pipe 123 to the diaphragm relay-valve 35, which is thus actuated so as to admit compressed air from the main supply-pipe 24 to cylinder 33, whereby the switch-points will be operated to the reverse position. The compressed air admitted to pipe 123, as above described, also enters branch pipe 125 and passes through port 118 (see Figs. 8 and 10) and through port or passage 117 in the valve-slide into chamber 45ª, Fig. 8, at the left of piston or buffer 47, but does not effect any movement of the valve-slide, which is held in the position shown by the connection 41ª engaging slot 122 in the motion-plate 36, Fig. 9; but when the motion-plate is moved so as to operate the switch-points a movement is given to rod 41ª (by the left-hand sloping portion of slot 122 acting on said rod) which moves the valve-slide 16ᵇ, Fig. 8, to its mid-position, leaving ports 120 121 open to exhaust, and when the movement of the motion-plate and of the switch-points has been completed a further movement is given to the slide-valve 16$^b$, (by means of the right-hand sloping part of slot 122 acting on rod 41$^a$,) which causes the port or passage 117 in the valve-slide to connect the ports 118 and 121 in the valve-seat, Figs. 8 and 10, so that the compressed air admitted to the branch pipe 125, Fig. 9, as previously described, now passes through port 118, passage 117, and port 121 into the controlling-pipe 28 (which is now acting as an indication-pipe) through valve-chamber 64 into the continuation of pipe 28 and through the branch pipe 28$^a$ to the indication-cylinder 15, thus automatically completing the stroke of the lever 1 and giving the indication, just as previously described with reference to Fig. 1, the pipes 27 and 28 being then opened to exhaust to the atmosphere through the valve 16$^a$, connected to the operating-lever 1. The valve-slide 16$^b$, Fig. 8, will be retained in the position to which it has been moved, as above described, by the rod 41$^a$ until a reverse movement of the switch-points (back to normal again) has been effected, when said slide-valve will be returned to the position shown in Fig. 8, thus connecting the ports 119 and 120 by means of passage 116, so that the compressed air admitted to pipe 28 (by the return stroke of the operating-lever 1, as already described) and to the branch pipe 126 will now be admitted through port 120, passage 116, and port 119 into the pipe 27 and through valve-chamber 65 to the continuation of said pipe 27 and thence to the indication-cylinder 14 in the signal-cabin, thus automatically completing the return stroke of lever 1 to the normal position.

It will be seen that should the connecting-rod 41$^a$, Figs. 8 and 9, break or become disconnected from the motion-plate or other means employed for operating said rod compressed air acting on either piston 47$^a$ or 46$^a$, as the case may be, will automatically move the valve-slide 16$^a$ to a position in which the pipes 27 and 28 are opened to exhaust to atmosphere, and consequently any other ports or pipes connected or adapted to be connected to said pipes will also be opened to exhaust, so that there can be no false indication given, and the fact that no indication is given in the signal-cabin informs the signalman that the mechanism is broken or defective.

Although I have shown and described certain details of construction, yet I do not wish to limit myself entirely to such constructions, as modifications might be made so long as the improvements or functions set forth are retained.

In the following claims the phrase "an apparatus of the class described" means apparatus for operating and indicating the position of railway switches, signals, crossing gates, bridge-locks, derailers, and other devices of a similar nature.

What I claim as my invention, and desire to secure by Letters Patent, is—

1. In an apparatus of the class described, a reciprocating controlling-valve having operating positions at the ends of its stroke; a lever for actuating said valve; and automatic means for connecting and disconnecting said lever and valve when the valve is in its intermediate positions.

2. In an apparatus of the class described, a controlling-valve having operating positions; a lever for actuating the valve; means for automatically connecting and disconnecting said lever and valve; and means for automatically resetting said valve to a normal non-operating position.

3. In an apparatus of the class described, a controlling-valve having operating positions; a lever for actuating the valve; means for automatically connecting and disconnecting said lever and valve; and means for automatically resetting said valve to a normal non-operating position, and to connect with and to actuate said lever to a position for a new operation.

4. In an apparatus of the class described, a movable part; a motor for operating the same; manual means for controlling the operation of the motor; and a combined controlling and indication valve comprising means for controlling the passage of the motive fluid to the motor, and also for controlling the passage of an impulse for indicating at the signal-cabin the completion of the movement of the movable part, and also having connection to the motion-plate for locking the same when the movement of the switch has been completed in either direction.

5. In an apparatus of the class described, a main supply-pipe; operating-pipes; a manual controlling device; a switch, signal, or like device; a motor thereat; a double-acting piston-valve, and two double check-valves, which jointly control ports in the valve-casing for admitting air from the main supply to and from the motor, and also control ports in the valve-casing for the admission of compressed air to the operating-pipes for indicating at the signal-cabin completion of the movement of the switch-signal, &c.

6. In an apparatus for operating railway switches, signals, and the like, by fluid-pressure; a controlling-valve as one part; a lever for actuating the valve as another part; a projection on one part and a recess on the other part; and means for forcing the projection and recess together at certain positions of the parts and for separating them at other positions thereof; and means for automatically resetting said valve to a normal non-operating position, and to connect with and to actuate said lever to a position for a new operation.

7. In an apparatus of the class described; a motor; a source of power-supply thereto; two operating connections; a controller for connecting the supply with either operating connection; an indicator; a movable part actuated by said motor; an indicator and valve mechanism in both connections for controlling the supply to the motor and adapted to connect the connections for actuating the indicator; and means for controlling the last-mentioned connection in accordance with the position of the movable part.

8. In an apparatus of the class described, a supply-pipe for conveying fluid-pressure from a supply thereof to a motor, two operating-pipes, a controller for connecting the supply-pipe with either operating-pipe, an indicator, a movable part, a motor for moving it, and valve mechanism in each operating-pipe for controlling the supply to said motor and adapted to connect the operating-pipes for actuating the indicator, and means for controlling the last-mentioned connection in accordance with the position of the movable part.

9. In an apparatus of the class described, a supply-pipe for conveying fluid-pressure from a supply thereof to a motor, two operating-pipes, a controller for connecting the supply-pipe with either operating-pipe, an indicator actuated by pressure in the operating-pipes, a movable part, a motor for actuating it, and valve mechanism in said operating-pipes for controlling the supply to said motor and adapted to connect the operating-pipes for actuating the indicator, and means for controlling the last-mentioned connection in accordance with the position of the movable part.

10. In an apparatus of the class described, a supply-pipe for conveying fluid-pressure from a supply thereof to a motor, two operating-pipes, a controller for connecting the supply-pipe with either operating-pipe, an indicator actuated by pressure in the operating-pipes, a movable part, a motor for actuating it, controlling-valves in the supply to the motor actuated by pressure in the operating-pipes, and valve mechanism in said operating-pipes for controlling the supply to and through said controlling-valves and adapted to connect the operating-pipes for actuating the indicator, and means for controlling the last-mentioned connection in accordance with the position of the movable part.

11. In an apparatus of the class described, a supply-pipe for conveying fluid-pressure from a supply thereof to a motor, two operating-pipes, a controller for connecting the supply-pipe with either operating-pipe, an indicator device for each operating-pipe actuated by pressure in said pipe, a movable part, a motor for actuating it, and valve mechanism in said operating-pipes for controlling the supply to the motor for moving it in one direction by pressure in one operating-pipe and adapted to connect said operating-pipe with the other operating-pipe for actuating its indicator device, and means for controlling the last-mentioned connection in accordance with the position of the movable part.

12. In an apparatus of the class described, a supply-pipe for conveying fluid-pressure from a supply thereof to a motor, two operating-pipes, a controller for connecting the supply-pipe with either operating-pipe, means for automatically resetting the controller to a normal position, an indicator actuated by fluid-pressure in the operating-pipes, a movable part, a motor for actuating it, and valve mechanism in each operating-pipe for controlling the supply to said motor and adapted to connect the operating-pipes for actuating the indicator, and means for controlling the last-mentioned connection in accordance with the position of the movable part.

13. In an apparatus of the class described, a supply-pipe for conveying fluid-pressure from a supply thereof to a motor, two operating-pipes, a controller for connecting the supply-pipe with either operating-pipe having piston mechanism for resetting said controller to a middle position by pressure from the supply-pipe, a movable part, a motor for actuating it, and valve mechanism in said operating-pipes for controlling the supply to said motor and adapted to connect the operating-pipe used for controlling the motor with the other operating-pipe for actuating the indicator, and means for controlling the last-mentioned connection in accordance with the position of the movable part.

14. In an apparatus of the class described, a supply-pipe for conveying fluid-pressure from a supply thereof to a motor, two operating-pipes, a controller for connecting the supply-pipe with either operating-pipe having piston mechanism for resetting said controller to a middle position by pressure from the supply-pipe, a movable part, a motor for actuating it, an automatic valve in each movable part for controlling the delivery of air according to the direction of the movement through it, and valve mechanism movable in accordance with the pressure in an operating-pipe for controlling the supply to the motor and adapted to connect the pipe just used for controlling the motor with the other pipe for actuating the indicator, and means for controlling the last-mentioned connection in accordance with the position of the movable part.

15. In a fluid-pressure valve for apparatus of the class described, a seat having a middle port for the supply, a port on either side thereof for operating connections, a valve on said seat having two exhaust-ports registering simultaneously with the two operating-ports, and a middle port adapted to connect the supply with either operating-port, and a pair of oppositely-acting pneumatic pressure devices connected with said middle port whereby pressure in the middle port resets the slide to a middle normal position when the latter is released from control.

16. In a valve device for apparatus of the class described, a pair of automatic valves connected with two operating-pipes, each valve having a movable perforated body, a valve for closing the perforation through said body by pressure in the operating-pipe and for moving said body to uncover an outlet-port therefrom, an exhaust-port in the valve-casing closed when the outlet-port is open and connected with said outlet-port around the valve-body when pressure ceases in the operating-pipe, whereby also pressure may pass through the valve-body and out through the operating-pipe.

17. In a valve device for apparatus of the class described, a pair of automatic valves connected with two operating-pipes, each valve having a movable perforated body, a valve for closing the perforation through said body by pressure in the operating-pipe and for moving said body to uncover an outlet-port therefrom, an exhaust-port in the valve-casing closed when the outlet-port is open and connected with said outlet-port around the valve-body when pressure ceases in the operating-pipe, whereby also pressure may pass through the valve-body and out through the operating-pipe, and a valve device controlled by the movable part of said apparatus and adapted to be actuated by fluid-pressure from said outlet, which valve device also uncovers and covers ports for controlling the motor of said apparatus.

In testimony whereof I affix my signature in presence of two witnesses.

WILFORD ARTHUR PELOQUIN COSSERAT.

Witnesses:
    J. GROOM,
    W. J. HORN.